United States Patent [19]
Yamaguchi et al.

[11] Patent Number: 5,491,676
[45] Date of Patent: Feb. 13, 1996

[54] TRACKING CONTROL APPARATUS AND TRACK JUMP DETECTION APPARATUS

[75] Inventors: Hiroyuki Yamaguchi, Hirakata; Mitsuro Moriya, Ikoma; Shinichi Yamada, Katano, all of Japan

[73] Assignee: Matsushita Electric Industrial Co., Ltd., Osaka, Japan

[21] Appl. No.: 261,088

[22] Filed: Jun. 15, 1994

Related U.S. Application Data

[63] Continuation of Ser. No. 986,544, Dec. 7, 1992, abandoned.

[30] Foreign Application Priority Data

Dec. 9, 1991 [JP] Japan ..................... 3-324428

[51] Int. Cl.$^6$ ........................................ G11B 7/00
[52] U.S. Cl. ..................... 369/44.28; 369/44.27; 369/44.33
[58] Field of Search ................. 369/32, 50, 48, 369/58, 44.27, 44.28, 44.29, 44.11, 44.26, 44.32, 44.33

[56] References Cited

U.S. PATENT DOCUMENTS

| | | | |
|---|---|---|---|
| 4,759,006 | 7/1988 | Koishi et al. | 369/44.28 |
| 4,796,247 | 1/1989 | Vogelsang | 369/44.28 |
| 4,805,163 | 2/1989 | Ohnuki | 369/44.28 |
| 4,819,219 | 4/1989 | Nagano | 369/44.28 |
| 4,887,253 | 12/1989 | Tateishi | 369/44.28 |
| 5,046,060 | 9/1991 | Chow et al. | 369/44.32 |
| 5,101,386 | 3/1992 | Kojima et al. | 369/44.28 |
| 5,148,417 | 9/1992 | Wong et al. | 369/44.28 |
| 5,170,384 | 12/1992 | Edahiro et al. | 369/44.28 |
| 5,195,067 | 3/1993 | Yanagi | 369/44.28 |
| 5,202,864 | 4/1993 | Moriya et al. | 369/32 |
| 5,214,626 | 5/1993 | Satoh et al. | 369/44.28 |
| 5,220,547 | 6/1993 | Yasukawa et al. | 369/44.28 |
| 5,235,577 | 8/1993 | Ogino | 369/44.28 |
| 5,239,526 | 8/1993 | Yamagishi et al. | 369/44.28 |
| 5,247,498 | 9/1993 | Takekoshi et al. | 365/44.28 |
| 5,291,467 | 3/1994 | Ishiwata et al. | 369/54 |

FOREIGN PATENT DOCUMENTS

| | | |
|---|---|---|
| 260722 | 3/1988 | European Pat. Off. . |
| 400810 | 12/1990 | European Pat. Off. . |

*Primary Examiner*—Nabil Z. Hindi
*Attorney, Agent, or Firm*—Wenderoth, Lind & Ponack

[57] ABSTRACT

A tracking control apparatus having a track jump detection device and a memory for storing driving signals for the tracking control detects a track jump, and when such a track jump has occured, makes the tracking control inoperative, decelerates the velocity of light beam caused by the track jump by driving a voice coil motor using signals inverted from the signals stored in the memory, and, thereby, restarts the tracking control quickly.

8 Claims, 8 Drawing Sheets

TRACKING CONTROL APPARATUS AND TRACK JUMP DETECTION APPARATUS

This application is a continuation of now abandoned application Ser. No. 07/986,544, filed Dec. 7, 1992.

BACKGROUND OF THE INVENTION

1. Field of the Invention

The present invention relates to a tracking control apparatus that makes a conversion means for recording and reproducing information follow a target track formed on a recording medium.

2. Description of the Related Art

As an example of prior art equipment for recording and reproducing information, there is an optical type recording and reproduction equipment.

Optical type recording and reproduction equipment writes and reads information by condensing a light beam and irradiating an information medium, which is called a disk hereafter, having a layer of material which can optically record and reproduce information. On the disk, there are tracks formed by grooving its substrate for recording and reproducing information. The layer of recording material is formed on the surface of the substrate by a vapor deposition. A semiconductor laser diode provides a light beam, which can be condensed to approximately the same size of its wavelength. The recording of a signal is made by modulating the amount of the light beam according to the signal and changing a physical property of the layer of recording material. The reproduction of a signal is made based on changes of light reflections from the disk, when the disk is irradiated by a constant, comparatively small power light beam.

Figure 2:
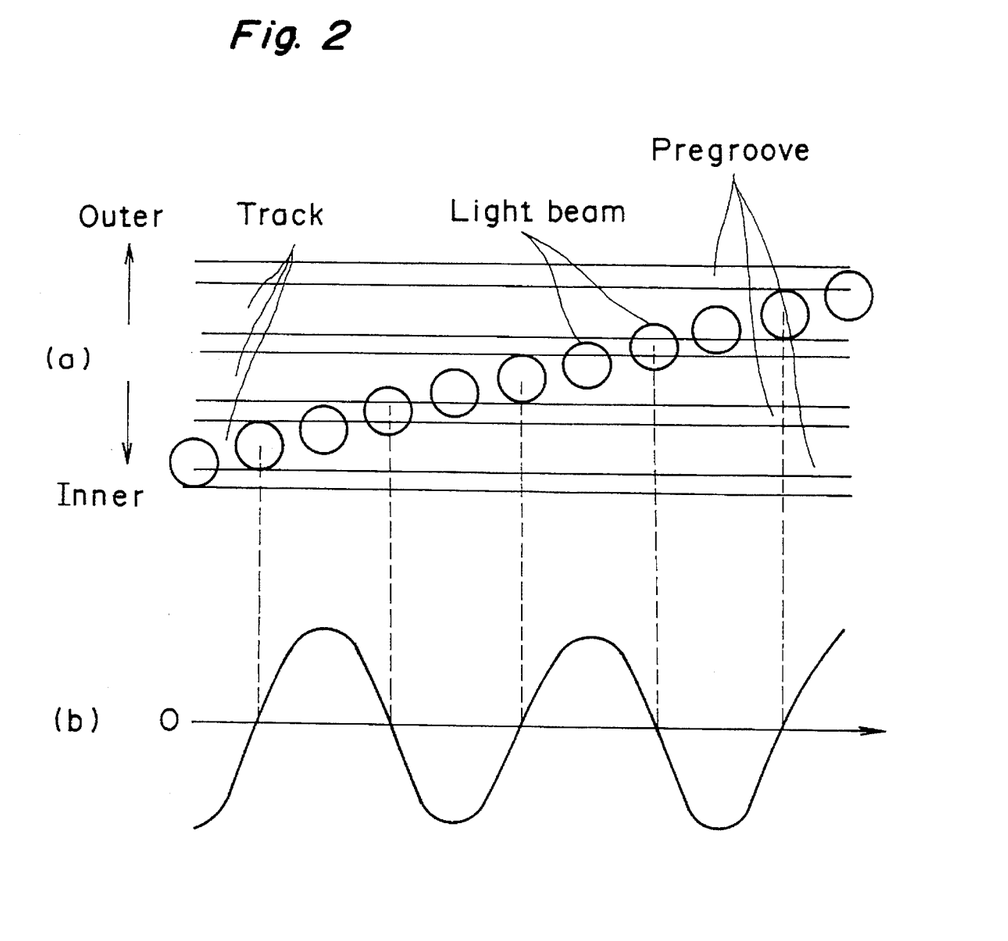

In optical type recording and reproduction equipment, focusing control and tracking control are performed. The focusing control keeps the light beam focusing on the layer of recording material in a predetermined focusing condition. The tracking control keeps the light beam located on a target track. The following is a description of a signal, which is hereafter called a tracking error signal and expresses a locational relationship between the target track and the light beam. As shown in FIG. 2 (a), concentric pre-grooves are cut on the disk with an uneven structure having a depth of about $\lambda/8$, where $\lambda$ is the wavelength of the light beam, and are located at regular intervals, and a zone between two neighboring pre-grooves is a track where information is recorded. A disk having such a structure is called an on-land disk. FIG. 2 (b) shows how the value of the tracking error signal changes, if a locational relationship between a target track and the light beam changes as shown in FIG. 2 (a). Since the fact that the tracking error signal is obtained as in FIGS. 2 (a)–(b) for any on-land disk by means of a push-pull method which is well-known to engineers working on related fields, a description of its theory has been omitted. In FIG. 2 (a), the upper section is an exterior part of the disk, and the lower section is interior part of the disk. If the light beam shifts in the exterior direction from a track, then the tracking error signal becomes positive, and if the light beam shifts in the interior direction from a track, then the tracking error signal becomes negative. If the light beam is located in the track or if the light beam is located between two tracks, ie. on a pre-groove, then the amplitude of the tracking error signal is zero. Also, if the light beam is located on a neighborhood of a track, then the amplitude of the tracking error is proportional to the displacement of the light beam from the track. If the light beam crosses a plurality of tracks as shown in FIG. 2 (a), then the tracking error signal is shaped like a sinewave curve as shown in FIG. 2 (b).

As in other electronic equipment, the need for compact optical recording and reproduction equipment has increased recently. Therefore, compact equipment that can be put on a desk of an office has been developed. Since such equipment is usually put on a desk, it often receives a tremendous shock from the outside. On the other hand, the maximum driving force of an actuator used for tracking control is limited and usually about between 10 G to 20 G. Therefore, if a shock having a larger acceleration than the maximum driving force is given from the outside, then the tracking control apparatus can not keep the light beam following a track, and the light beam shifts out of a predetermined track, ie. a so-called track jump occurs. A response of the tracking control in the case of a track jump is shown in FIG. 3.

Figure 3:
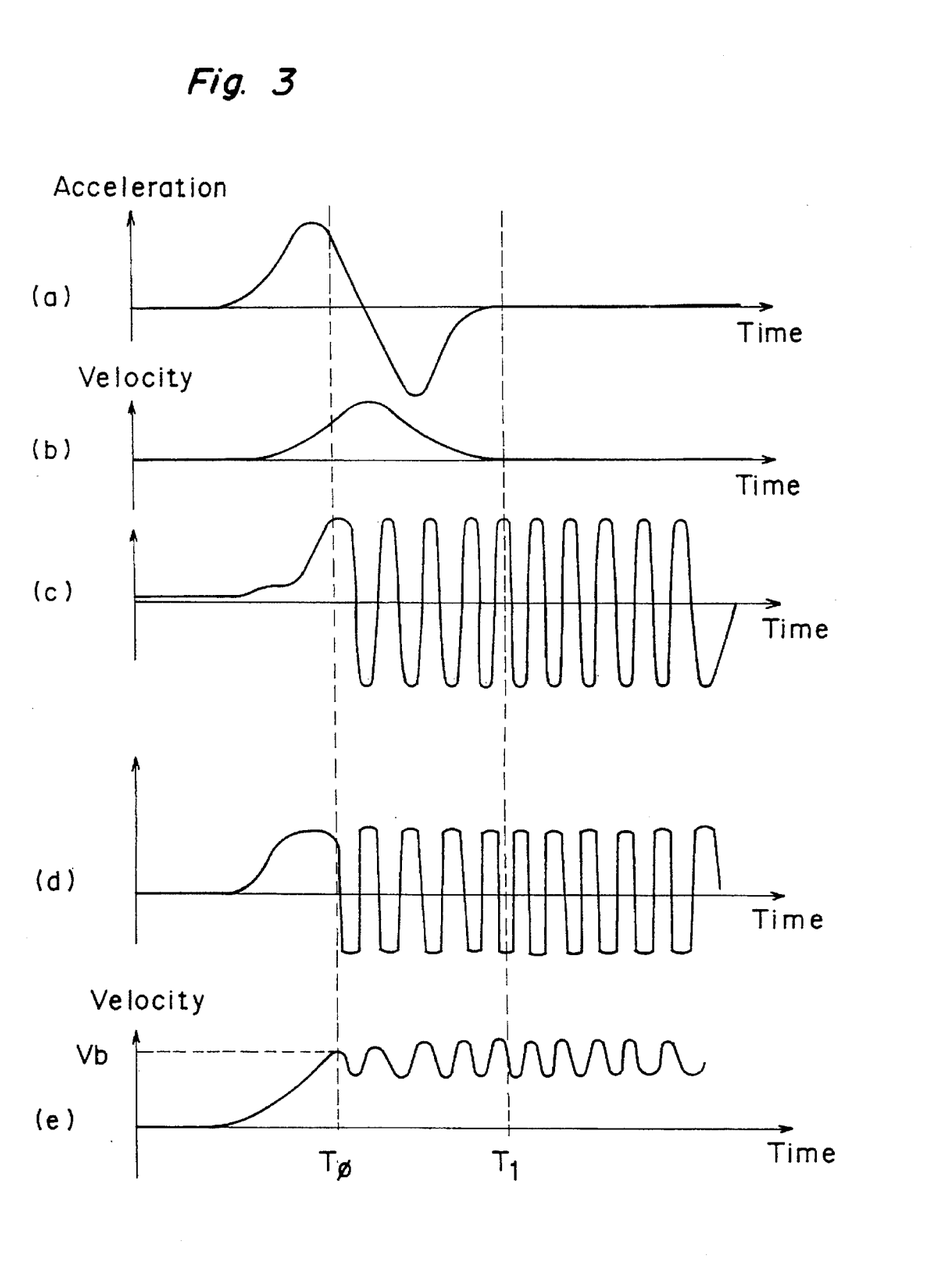

In FIG. 3, (a) shows the acceleration of an external shock, (c) shows a tracking error signal, and (d) shows a driving signal that drives the actuator, where the vertical axes show time. For simplicity, the external shock is assumed to be a sine curve of one period in FIG. 3. If an external shock occurs, the tracking control apparatus tries to respond and keep the light beam following a target track. However, since the external shock has a larger magnitude than the maximal driving force of the actuator, the amplitude of the tracking error signal increases, ie. a locational error of the light beam against the track increases. And finally, at time T0, track jump occurs. In FIG. 3, (b) and (e) show the time integrals of the external shock (a) and the driving signal (d), ie. the velocity of the light beam, respectively. At time T0 when track jump occurs, the light beam has the velocity $V_b$ to follow the external shock. In general, the responsibility of tracking control is limited and is at most 2 to 3 kHz. Therefore, if $V_b$ is larger than a predetermined value, then the light beam can not immediately pull in a track and move across tracks. Since, as described above, the tracking error signal has a sine curve shape at this time, the driving signal also has a sine curve shape. Therefore, even if the external shock ends at time T1, and its velocity returns to zero, the velocity of the actuator, ie. the velocity of the light beam, does not return to zero and retains values around $V_b$ as shown in FIG. 3 (e), though it repeats a fluctuation following the driving signal. In this state, it is impossible for the light beam to pull in a track, and a so-called track-skating phenomenon occurs, where the light beam continues to run across tracks. If a track-skating occurs, the light beam keeps moving until the actuator crashes against a stopper installed at the end of its movable extent, and, in the worst case, the failure of focusing control and mechanical damage, such as damage to the actuator, results.

SUMMARY OF THE INVENTION

The object of the present invention is therefore to provide a tracking control apparatus in which no track-skating occurs, even if a strong shock occurs from the outside.

In order to achieve the aforementioned objective, according to one aspect of the present invention, there is provided a track jump detection circuit that detects a track jump, a memory that stores the driving signal of tracking control, and an adder that inverts and adds the signal stored in the memory to the actuator. By means of the above components, the present invention stores the driving signal of tracking control for a predetermined time period immediately preceding an occurrence of track jump. And if track jump occurs, then the present invention prevents a track skating by making the tracking control inoperative, subsequently inverting and adding the signal stored in the memory to the actuator, thereby decreasing the velocity caused by the track jump and held by the actuator, and, by making the tracking control operative thereafter, the light beam can quickly pull in a track again.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIG. 2(a–b) illustrates the tracking error signal corresponding to a locational relationship between the light beam and tracks.

FIG. 3(a–e) shows a response of the tracking control to a given external shock.

FIGS. 7(a–e) and 8(a–f) are time charts for describing the responses of the tracking control to a given external shock in the embodiment according to the present invention.

DETAILED DESCRIPTION OF THE PREFERRED EMBODIMENT

The preferred embodiment according to the present invention will be described below with reference to the attached drawings.

Figure 1:
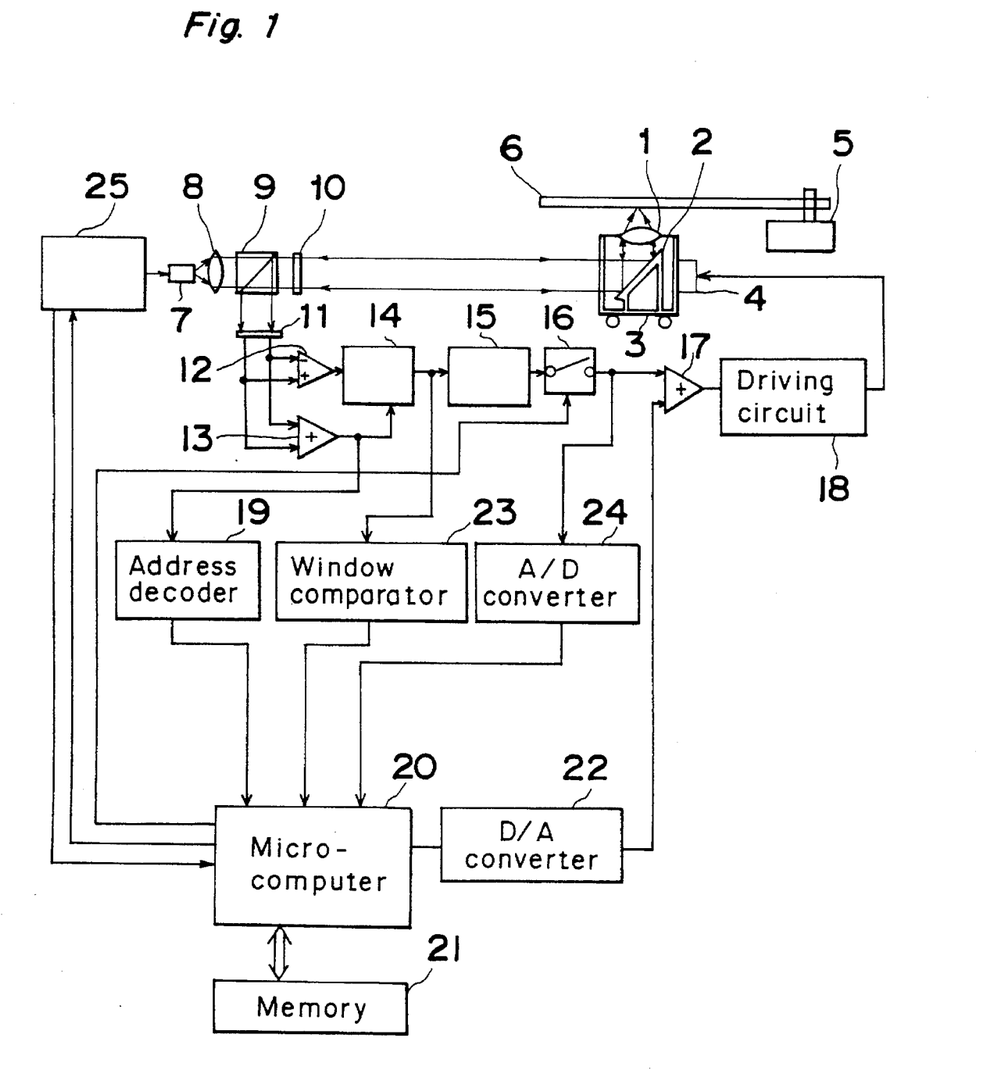
FIG. 1 is a block diagram of an embodiment according to the present invention.

The object of the present invention is to prevent track skating that occurs following track jump caused by an external shock and to realize stable tracking control. FIG. 1 is a block diagram of the tracking control apparatus which is an embodiment according to the present invention. An objective lens 1 and a reflecting mirror 2 are mounted on a transfer table 3. The transfer table 3 is driven by a voice coil motor 4 in the direction of a radius of the disk 6 rotated by a disk motor 5.

A light beam emitted from a light source 7 such as a semi-conductor laser is incident on a collimating lens 8 and emerges therefrom as a light beam of parallel rays, which passes through a polarized beam splitter 9 and a $(\frac{1}{4})\lambda$ plate 10, where $\lambda$ is the wavelength of the light beam, and is incident on the mirror 2. The light beam reflected by mirror 2 is condensed by the objective lens 1 and is focused on the disk 6. The reflected light from the disk 6 passes through the objective lens 1, is reflected by the mirror 2, passes through the $(\frac{1}{4})\lambda$ plate 10, is reflected by the polarized beam splitter 9, and is incident on a split photo detector 11. The splitting line of the split photo detector 11 is located in the longitudinal direction of tracks.

Each output signal from the split photo detector 11 is input into a differential amplifier 12 and an additive amplifier 13, which respectively calculate the difference and the sum of the two signals. The output from the differential amplifier 12 is input into a numerator input terminal of an AGC circuit 14, and the output from the additive amplifier 13 is input into a denominator input terminal of the AGC circuit 14. The AGC circuit 14 calculates and outputs the quotient resulting from dividing the input signal fed into the numerator input terminal by the input signal fed into the denominator input terminal. It is known that AGC circuit 14 in the system organized as above outputs a tracking error signal as shown in FIG. 2 (b). The purpose of the division in the AGC circuit 14 is to prevent a fluctuation of the amplitude of the tracking error signal caused by changes in the luminous power of the light source 7.

The tracking error signal is input into the voice coil motor 4 through a phase compensation circuit 15, a switch 16, an additive amplifier 17, and a driving circuit 18, and tracking control is performed through this route. A phase compensation circuit 15 secures the stability of the tracking control. The switch 16 makes tracking control either operative or inoperative depending on a control signal input into its control terminal. In each track, its address is cut with an uneven structure having a depth of about $(\frac{1}{4})\lambda$, where $\lambda$ is the wavelength of the semiconductor laser, to distinguish it from other tracks. It is known that an address formed like this can be reproduced by the reflections of the light beam from the disk. In the present embodiment, the output from the additive amplifier 13 is input into an address decoder 19 that reads each address. The address read by the address decoder 19 is input into a microcomputer 20. Therefore, microcomputer 20 is configured so that it can know the address of the track that the light beam is currently following. Microcomputer 20 is connected to a random-access read and write memory 21 and can store arbitrary information in and retrieve arbitrary information from the memory 21. The microcomputer 20 is connected to a D/A converter 22, which is in turn connected to an input terminal of the additive amplifier 17. Therefore, the microcomputer 20 can drive the voice coil motor 4 and thereby move the light beam. Also, a control signal from the microcomputer 20 is output to the control terminal of the switch 16, so that the microcomputer 20 can control the on/off of the switch 16. On the other hand, the output from the AGC circuit 14 is input to a window comparator 23. The window comparator 23 obtains the absolute value of the input signal and then converts the absolute value to a binary value. Specifically, the window comparator 23 outputs a high-level signal to the microcomputer 20, if the absolute value of the input signal is greater than a predetermined threshold value. If the absolute value is not greater than the threshold value, then window comparator 23 outputs a low-level signal to the microcomputer 20. The output from the switch 16 is input to an A/D converter 24, which converts the analog signal into a digital signal and outputs it to the microcomputer 20. As a result, the microcomputer 20 can fetch the tracking control driving signal when needed. Also, the light source 7 is controlled by the light source control circuit 25.

The light source control circuit 25 controls the amount of light. Specifically, in the recording mode, the light source control circuit 25 modulates the amount of light according to the signal to be recorded, and, in the reproduction mode, it keeps the amount of light at a comparatively low constant level. The light source control circuit 25 also outputs a high-level recording flag signal to the microcomputer 20, when recording, and outputs a low level-recording flag signal to the microcomputer 20 otherwise. On the other hand, the microcomputer 20 outputs a recording permission signal to the light source control circuit 25, which performs a recording operation, if the permission signal is at a high level. If the permission signal is at a low level, then even if a recording operation is being performed, the light source control circuit 25 stops the recording and returns the amount of light to a comparatively low level for reproduction mode. Therefore, the microcomputer 20 can immediately stop a recording operation at any time.

As described above, in the reproduction mode, the light source control circuit 25 keeps the amount of light of the light source 7 at a comparatively low level and outputs a low-level recording flag signal to the microcomputer 20, while switch 16 is closed by a control signal from the microcomputer 20, and tracking control is performed. At that time, the light beam is following a concentric circular track on disk 6.

Figure 4:
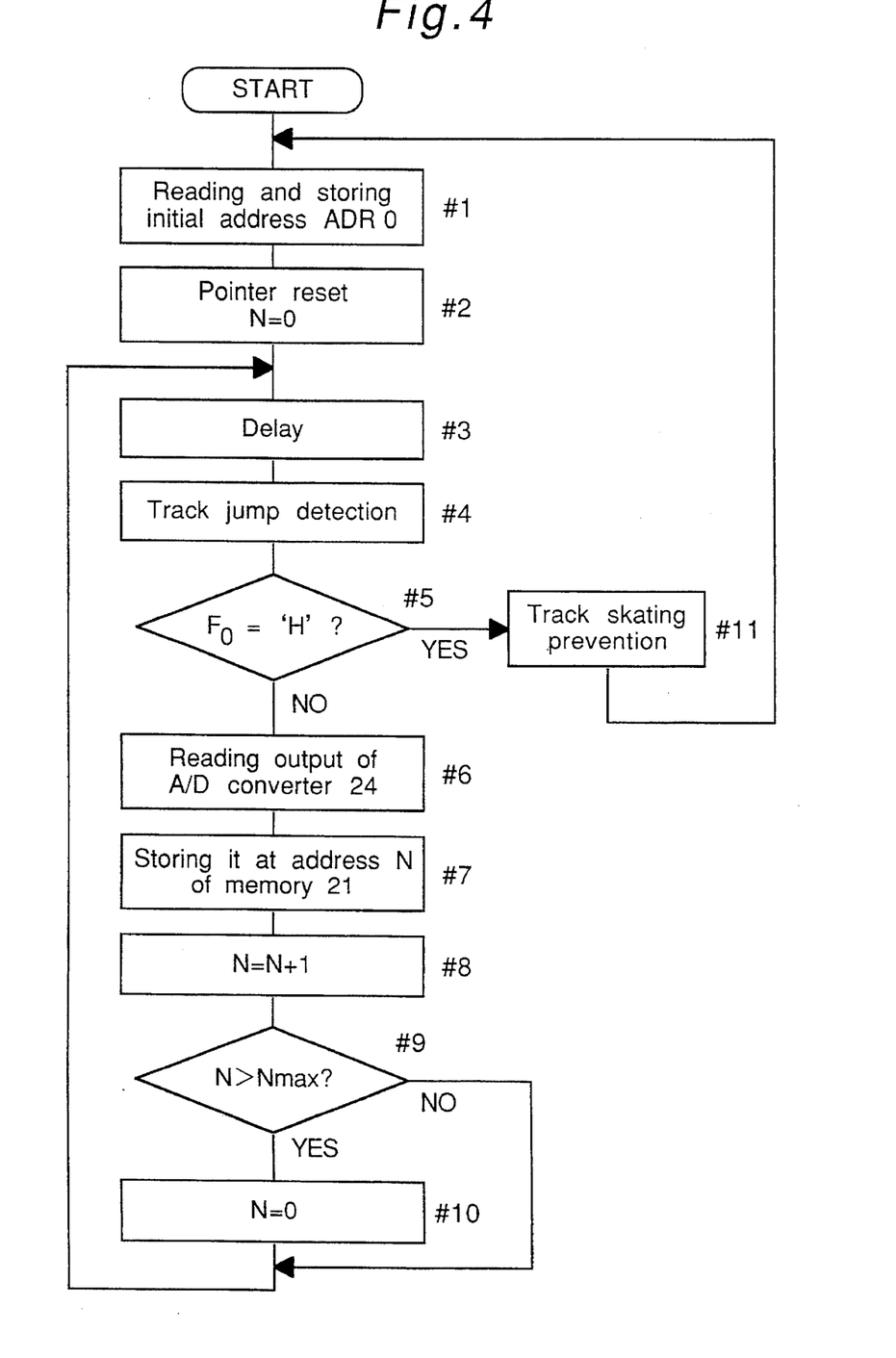
FIG. 4 is a flowchart of processing by a microcomputer used in the embodiment according to the present invention.
Figure 5:
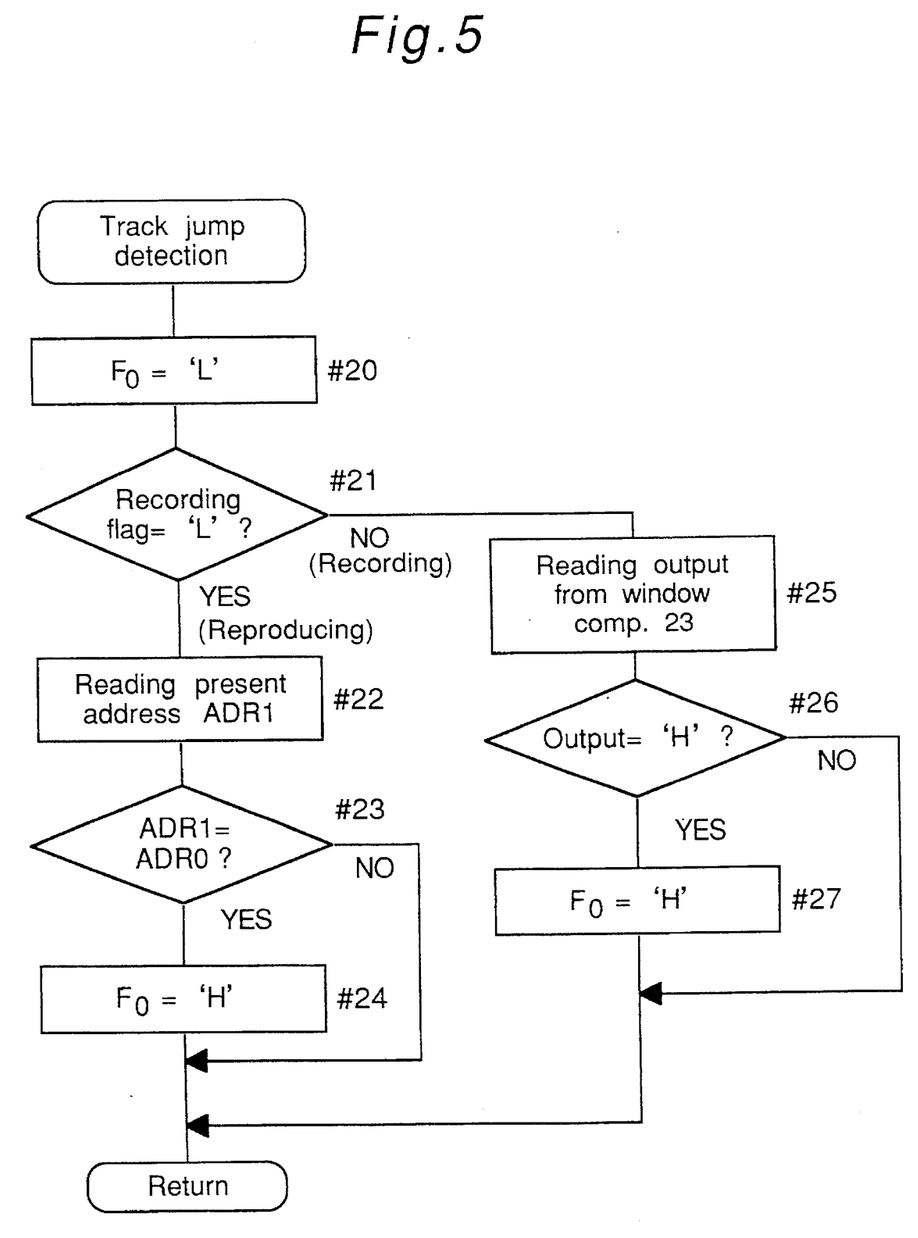
FIG. 5 is a flowchart of processing by the microcomputer used in the embodiment according to the present invention.
Figure 6:
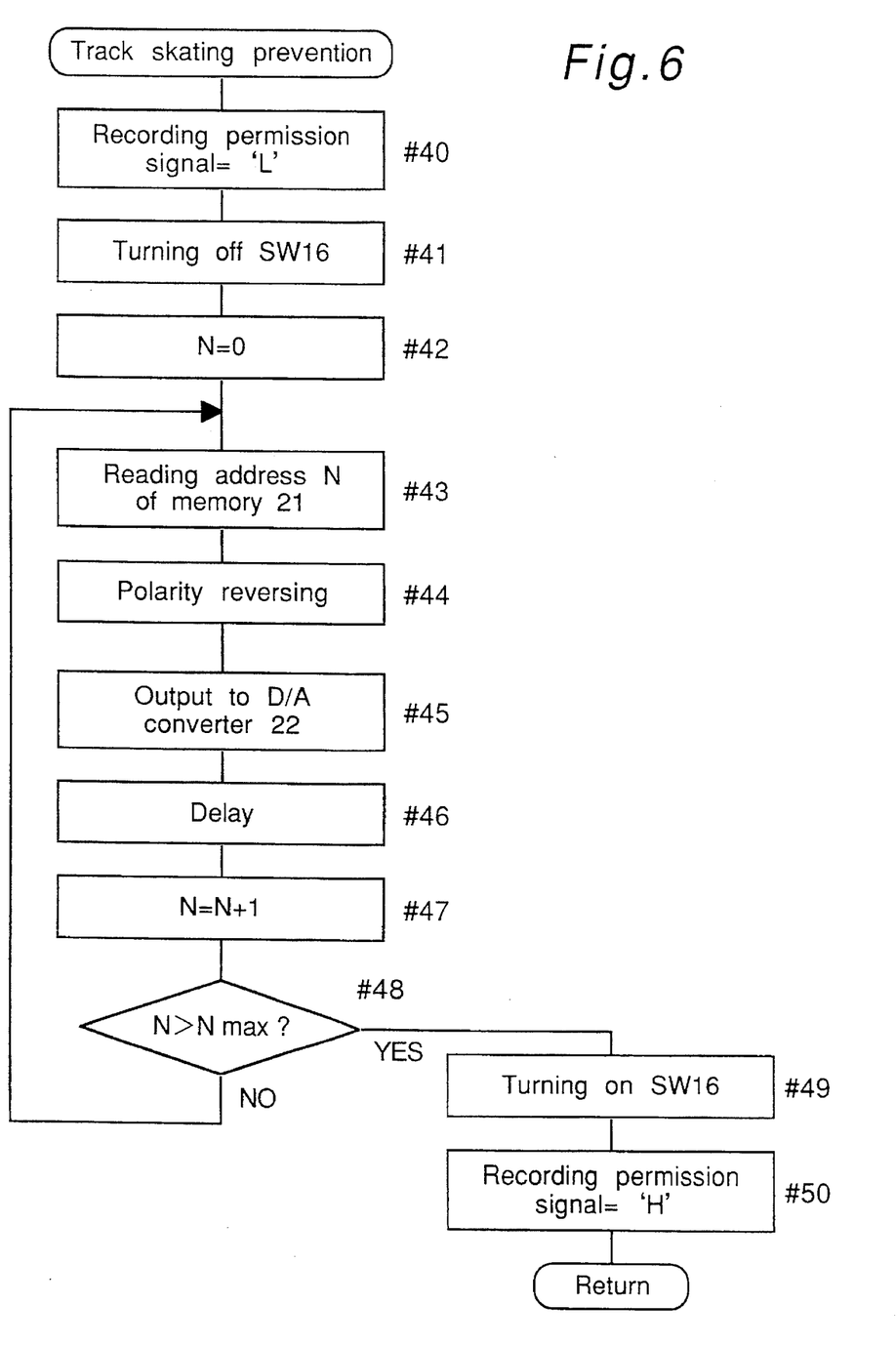
FIG. 6 is a flowchart of processing by the microcomputer used in the embodiment according to the present invention.
Figure 7:
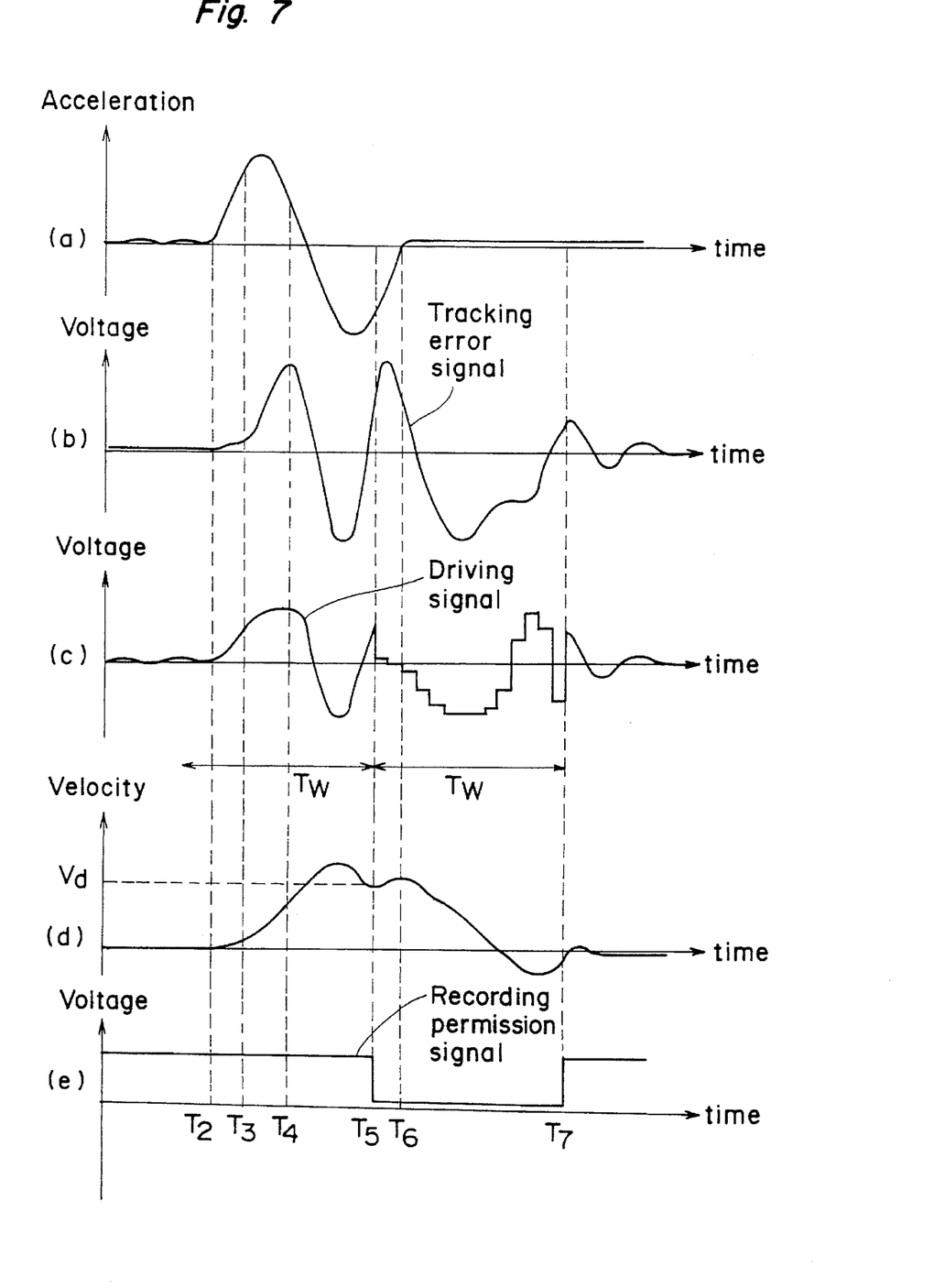

The following is a description of the operation of the tracking control apparatus, with reference to the flowcharts shown in FIGS. 4, 5, and 6 and the time chart shown in FIG. 7, in case a shock occurs from the outside, and a track jump occurs.

FIGS. 4, 5, and 6 show the processing by the microcomputer 20. FIG. 4 is a flowchart of the initial operation and the storage operation for the tracking control driving signal. FIG. 5 is a flowchart of the detection processing for track jump. FIG. 6 is a flowchart of track-skating prevention processing performed when a track jump is detected. In step 1 of FIG. 4, the microcomputer 20 reads the value of an initial address of tracks from the address decoder 19 and stores it. The initial address is referred to below as ADR0. Next, in step 2, the microcomputer 20 initializes the address pointer N as 0, which is used when the tracking control driving signal is stored in and read from memory 21. In steps 3 and 4, after a delay for making the sampling period be a constant value w for fetching the tracking control driving signal from the A/D converter 24, the microcomputer 20 performs track jump detection processing, which is described later. In step 5, the microcomputer 20 performs conditional branching depending on the flag F0 that is obtained in track jump detection processing and indicates whether or not a track jump has been detected. If F0 is at a high level, ie. a track jump has been detected, then the microcomputer 20 performs track skating prevention processing (Step 11), which is described later. If F0 is at a low level, then the microcomputer 20 fetches the tracking control driving signal from the A/D converter 24 (Step 6). The fetched digitalized driving signal is stored in the address of the memory 21 designated by the address pointer N (Step 7). Next, the microcomputer 20 increments the address pointer N and tests if the value of N is greater than an upper bound Nmax (Steps 8 and 9). If N is greater than Nmax, then the microcomputer 20 resets N to zero (Step 10) and returns to step 3. In this way, if a track jump is not detected, then the microcomputer 20 repeats the loop from step 3 to step 10. During this process, the tracking control driving signal is fetched at an interval of the sampling period w and stored in the addresses 0 to Nmax of the memory 21 cyclically.

Next, track jump detection processing is described below with reference to FIG. 5. In track jump detection processing, the microcomputer 20 first initializes the flag F0, which indicates whether or not a track jump has been detected, to a low level (Step 20). Next, the microcomputer 20 fetches the recording flag signal output from the light source control circuit 25. If the recording flag signal is at a low level, ie. in the reproduction mode, then steps 22 to 24 are executed, and if the recording flag signal is at a high level, then steps 25 to 27 are executed (Step 21). If the recording flag signal is at a low level, then the microcomputer 20 reads address data, denoted by ADR1 below, output from the address decoder 19 and compares it with the initial address ADR0 (Step 23).

As described earlier, since each concentric track is assigned a distinctive address, if the read address data ADR1 does not coincide with the initial address ADR0, then track jump has occurred. Therefore, in that case, the microcomputer 20 sets the track jump detection flag F0 at a high level. If the address data ADR1 coincides with the initial address ADR0, then microcomputer 20 finishes the track jump detection procedure and returns to Step 5 of FIG. 4 (Step 24). On the other hand, if the recording flag signal is at high level, ie. in the recording mode, then the microcomputer 20 reads the output from the window comparator 23 (Step 25). As described before, the window comparator 23 compares the absolute value of the output from AGC circuit 14 with a predetermined threshold value and converts the absolute value to a binary value. The threshold value for the window comparator 23 is set to be smaller than the maximum absolute value of the tracking error signal output from AGC circuit 14, eg. 60% of the latter. Therefore, the fact that the output from the window comparator 23 has changed from a low level to a high level means that the locational relationship between the light beam and the track on the disk has changed owing to a cause such as an external shock, and the tracking error against the track has increased beyond a certain limit. Therefore, if the output from the comparator 23 is at a high level, then the microcomputer 20 sets the track jump detection flag F0 to a high level. If the output from the window comparator 23 is at a low level, then the microcomputer 20 finishes the track jump detection procedure and returns to step 5 of FIG. 4 (Step 27).

The reason why the reproduction mode and recording mode procedures are different in the above track jump detection procedure is explained as follows. The track jump detection procedure from Step 22 to Step 24 based on the address comparison can be performed without false detection. However, when the microcomputer 20 reads a different address from the initial address, track jump has already occurred and the light beam has already moved into another track. On the other hand, the track jump detection procedure based on the output of the window comparator 23 may be performed with false detection, if, for example, a spike-shaped noise, such as that caused by a mixture of an alien substance with the disk is added to the tracking error signal. However, this procedure can detect a track jump before it finishes, because the procedure is based on the off-track light beam amount. As a matter of fact, if track jump occurs during recording, then not only has the recording of information failed but also the information already recorded on neighboring tracks is destroyed by overwriting. In order to prevent such a situation, it is necessary to detect track jump before it finishes. On the other hand, track jump during reproduction does not cause the destruction of information unlike during recording, and it is better to avoid frequent malfunctioning during reproduction. Therefore, track jump detection is performed by means of the window comparator 23 in the recording mode and by means of the address comparison in the reproduction mode.

Next, the procedure of track skating prevention processing is described with reference to FIG. 6. As mentioned above, if the track jump detection procedure detects a track jump and sets the flag F0 to a high level, then track skating prevention processing is performed (Steps 5, 11 of FIG. 4). In track skating prevention processing, the microcomputer 20 first sets a recording permission signal at a low level for the light source control circuit 25 (Step 40). By this setting, the light source control circuit 25 immediately stops the recording operation, if in the recording mode, and returns to the reproduction mode. As described above, since track jump detection is performed based on the output from the window comparator 23 during recording, the light beam has not yet moved into a neighboring track, when track jump is detected. Therefore, the destruction of already recorded information caused by track jump is prevented during recording. The recording permission signal is also set at a low level in the reproduction mode. This setting prevents the situation that the apparatus starts recording following a host computer's recording command when the light beam is accidentally located on a track to be recorded while moving across tracks during a track jump in the reproduction mode.

Next, the microcomputer 20 makes the tracking control inoperative by the turning switch 16 off (Step 41), and resets the address pointer N to zero (Step 42). The microcomputer 20 reads the tracking control driving signal stored in the address designated by the address pointer N, inverts the polarity of the signal, and outputs it to the D/A converter 22 (Steps 43 to 45). After a delay that makes the period of the output driving signal equal to the sampling period w for fetching from the A/D converter 24, the microcomputer 20 increments the address pointer and compares it with the maximum address Nmax (Steps 46 to 48). If the value of the address pointer N is not greater than Nmax, then the microcomputer 20 returns to step 43.

If the value of the address pointer N is greater than Nmax, then the microcomputer 20 turns switch 16 on, makes the tracking control operative, and, after resetting the recording permission signal to a high level, returns to step 1 of FIG. 4 (Steps 48 to 50). In this way, the tracking control driving signal stored in the memory 21 for the period of TW immediately before the start of track jump is polarity-inverted and added to the voice coil motor 4, tracking control is made operative, and recording is made operable again, where $$TW=(Nmax+1)*w.$$

Next, the operation of the present embodiment organized as above is described below with reference to the time chart of FIG. 7, when a shock occurs from the outside during reproduction. In FIG. 7, (a) shows the acceleration of the shock; (b) shows the tracking error signal; (c) shows the driving signal of tracking control; (d) shows the time integral of the driving signal, ie. the velocity of the light beam; (e) shows the recording permission signal. In (d), the initial value is shown as 0, immediately before the external shock occurs to the apparatus. For simplicity, it is assumed that the shock occurs from time T2 to time T6 as a sine curve of one period. If a shock occurs to the apparatus at time T2, then the driving signal increases, because the tracking control follows the shock (from time T2 onward in (c)). At that time, the tracking error signal shows a state of having a slight tracking control error, ie. being slightly off track, with a slightly increased amplitude (T2 to T3 in (b)). In this state, tracking control is sufficiently covering the shock, there is no problem for the operation of the apparatus. However, the shock continues to increase thereafter and exceeds the maximum thrust of the tracking actuator at time T3. As a result, tracking control becomes unable to cover the shock, and the amplitude of the tracking error signal rapidly increases, ie. the off-track amount of the light beam increases (T3 to T4 in (b)), until track jump occurs (T4 to T5 in (b)). Since the address data ADR1 differs from the original address ADR0 as a result, track jump is detected at time T5, and the recording permission signal is set at a low level, while tracking control is made inoperative (T5 in (c) and (e)). At that moment, the voice coil motor 4 has a velocity Vd, which is the time integral of the driving signal. On the other hand, the driving signal for the period TW immediately preceding time T5 is stored in the memory 21. If, for simplicity, the last driving signal fetched from A/D converter 24 is stored in the address Nmax, then, from time T5, the driving signal stored in addresses 0 to Nmax of the memory 21 is sequentially inverted and added to the voice coil motor 4 (T5 to T7 in (d)). By increasing the capacity of the memory 21, the time period for which the driving signal is stored in the memory 21 is sufficiently larger than the time from the start of the shock to the detection of track jump, ie. from T2 to T5. Therefore, the whole driving signal caused by the shock can be stored in the memory 21. As a result, at time T7 when the process that the driving signal stored in the memory 21 is inverted and added to the voice coil motor 4 ends, where T7=T5+TW, the velocity of the light beam is restored to almost the same level, ie. zero, as before the shock occurred to the apparatus (T5 to T7 in (e)). Therefore, when tracking control is resumed at time T7, and the recording permission signal is set to a high level, the light beam pulls in a near track, and the apparatus becomes ready for recording.

Figure 8:
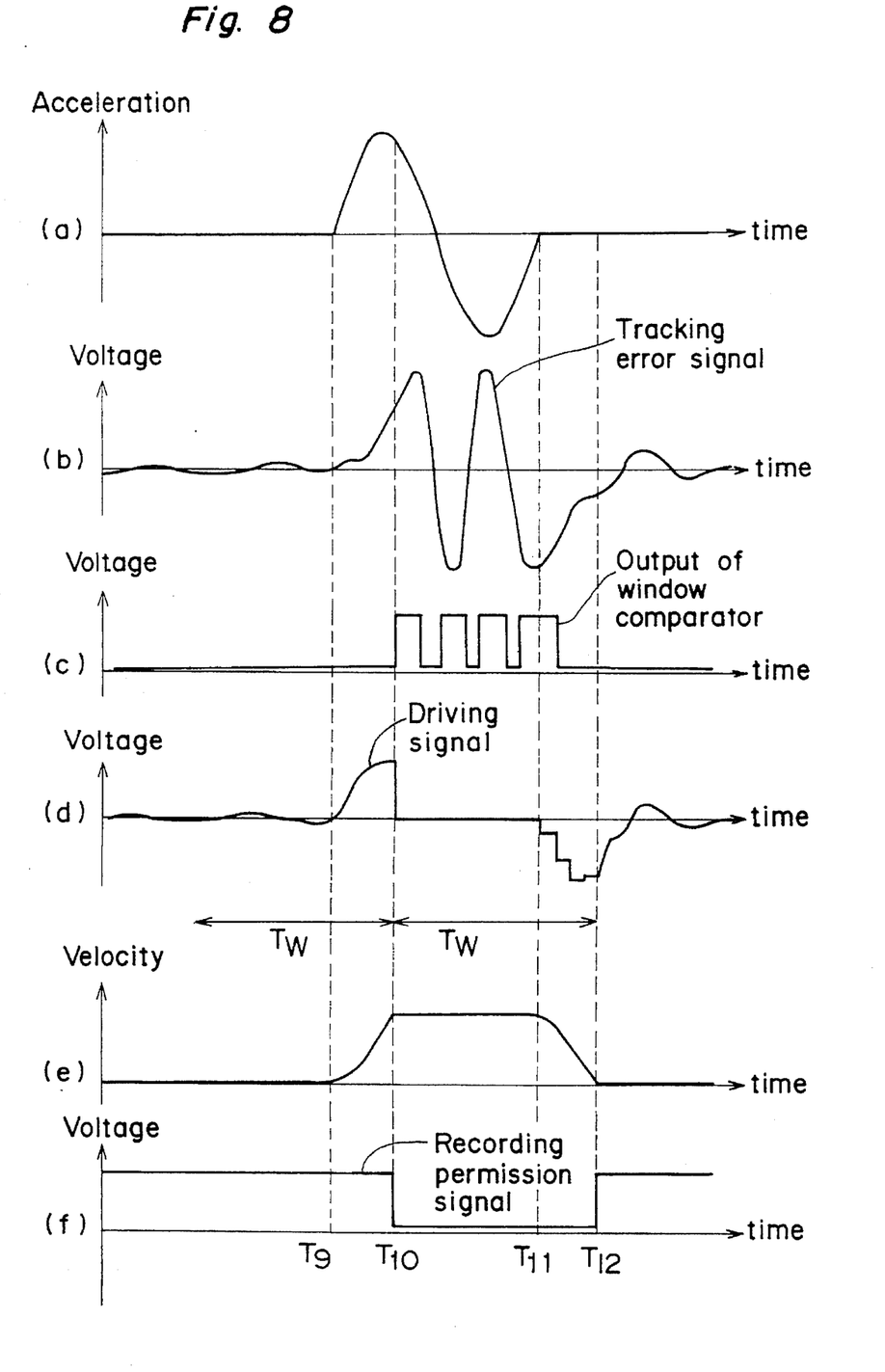

Finally, the operation of the present embodiment is described below with reference to the time chart of FIG. 8, when a shock occurs from the outside during recording. In FIG. 8, (a) shows the acceleration of the shock; (b) shows the tracking error signal; (c) shows the output signal from window comparator 23; (d) shows the driving signal of tracking control; (e) shows the time integral, of the driving signal, ie. the velocity of the light beam; (f) shows the recording permission signal. In (e), the initial value is shown as 0, immediately before the external shock occurs to the apparatus. For simplicity, as in FIG. 7, it is assumed that the shock occurs from time T9 to time T11 as a sine curve of one period. If a shock occurs to the apparatus at time T9, then the driving signal increases, because the tracking control follows the shock. When the shock exceeds the maximum thrust of the tracking actuator, the tracking control becomes unable to cover the shock, and the amplitude of the tracking error signal rapidly increases. When the amplitude of the tracking error signal reaches 60% of its maximum value at time T10, the output from window comparator 23 changes from a low to a high level, tracking control is made non-operative, and the recording permission signal is set to a low level. As a result, the light source control circuit 25 immediately stops recording. At time T10 when recording is interrupted, the light beam has not yet moved into a neighboring track. Therefore, data recorded on neighboring tracks are not destroyed. Thereafter, from time T10, the driving signal stored in addresses 0 to Nmax of the memory 21 is sequentially inverted and added to the voice coil motor 4. As a result, at time T12 when the process that the driving signal stored in the memory 21 is inverted and added to the voice coil motor 4 ends, the velocity of the light beam is restored to almost the same level, ie. zero, as before the shock occured to the apparatus. Therefore, when tracking control is resumed at time T12, and the recording permission signal is set to a high level, the light beam pulls in a near track, and the apparatus becomes ready for recording.

Although the present invention has been fully described in connection with the preferred embodiment thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A tracking control apparatus comprising:
   a conversion means for recording information on and for reproducing information from a recording medium having a plurality of tracks on which information is recorded and is to be recorded;
   a location detection means for detecting a locational relationship on said recording medium between said conversion means and said plurality of tracks;
   a transfer means for transferring said conversion means in a direction perpendicular to said plurality of tracks on said recording medium;
   a tracking control means for controlling said conversion means by driving said transfer means in accordance with an output from said location detection means, so that said conversion means always follows a target track;
   a track jump detection means for detecting as a track jump said conversion means failing to follow said target track;
   an analog to digital conversion means for sampling and digitizing a signal for driving said transfer means;
   a read/write memory for storing a plurality of signals sampled and digitized by said analog to digital conversion means for a predetermined time interval which has occurred prior to the detection of a track jump;
   a reversing means for reversing polarities of said plurality of signals read out from said read/write memory; and
   a control means for making said tracking control means inoperative and for driving said transfer means in accordance with signals obtained by reversing polarities of said plurality of signals and digital to analog converting said plurality of signals when said track jump detection means has detected a track jump.

2. The tracking control apparatus as claimed in claim 1, wherein said control means further controls said tracking control means in such a manner that said tracking control means is made operative after driving said transfer means with said signals with reversed polarities.

3. The tracking control apparatus as claimed in claim 1, wherein each of said plurality of tracks has an address for identification and said track jump detection means has an address reading device for reading the address of each track at every predetermined time and a comparator for comparing an absolute value of said output from said location detection means with a predetermined value; wherein said track jump detection means detects a track jump when an address of a track read at said present time is different from that read at the latest time which occurred when reproducing signals and when said comparator determines that said absolute value of said output of said location detection means exceeds said predetermined value during recording.

4. The tracking control apparatus as claimed in claim 2, wherein each of said plurality of tracks has an address for identification and said track jump detection means has an address reading device for reading the address of each track at every predetermined time and a comparator for comparing an absolute value of said output from said location detection means with a predetermined value; wherein said track jump detection means detects a track jump when an address of a track read at said present time is different from that read at the latest time which occurred when reproducing signals and when said comparator determines that said absolute value of said output of said location detection means exceeds said predetermined value during recording.

5. A tracking control apparatus comprising:
   a conversion means for recording information on and for reproducing information from a recording medium having a plurality of tracks on which information is recorded and is to be recorded;
   a location detection means for detecting a locational relationship on said recording medium between said conversion means and said plurality of tracks;
   a transfer means for transferring said conversion means in a direction perpendicular to said plurality tracks on said recording medium;
   a tracking control means for controlling said conversion means by driving said transfer means n accordance with an output from said location detection means, so that said conversion means always follows a target track;
   a track jump detection means for detecting as a track jump said conversion means failing to follow said target track;
   an analog to digital conversion means for sampling and digitizing a signal for driving said transfer means,
   a read/write memory for storing a plurality of signals sampled and digitized by said analog to digital conversion means for a predetermined time interval which has occurred prior to the detection of a track jump,
   a reversing means for reversing polarities of said plurality of signals read out from said read/write memory; and
   a prohibition means for prohibiting the recording of information; and
   a control means for making said tracking control means inoperative and for driving said transfer means in accordance with signals obtained by reversing polarities of said plurality of signals and digital to analog converting said plurality of signals and for making said prohibition means operative to prohibit the recording when said track jump detection means has detected a track jump and, thereafter, making said tracking control means operative and releasing the prohibition by said prohibition means.

6. The tracking control apparatus as claimed in claim 5, wherein each of said plurality of tracks has an address for identification and said track jump detection means has an address reading device for reading the address of each track at every predetermined time and a comparator for comparing an absolute value of said output from said location detection means with a predetermined value; wherein said track jump detection means detects a track jump when an address of a track read at said present time is different from that read at the latest time which occurred during reproducing signals and when said comparator determines that said absolute value of said output of said location detection means exceeds said predetermined value during recording.

7. The tracking control apparatus as claimed in claim 5, wherein said control means further controls said tracking control means in such a manner that said tracking control means is made operative after driving said transfer means with said signals with reversed polarities.

8. The tracking control apparatus as claimed in claim 7, wherein each of said plurality of tracks has an address for identification and said track jump detection means has an address reading device for reading the address of each track at every predetermined time and a comparator for comparing an absolute value of said output from said location detection means with a predetermined value; wherein said track jump detection means detects a track jump when an address of a track read at said present time is different from that read at the latest time which occurred during reproducing signals and when said comparator determines that said absolute value of said output of said location detection means exceeds said predetermined value during recording.

* * * * *